(12) United States Patent
Llado et al.

(10) Patent No.: US 12,375,368 B2
(45) Date of Patent: Jul. 29, 2025

(54) PERSONALIZED SERVICE SCHEDULING

(71) Applicant: Microsoft Technology Licensing, LLC, Redmond, WA (US)

(72) Inventors: Pol Llado, Brookline, MA (US); Lihao Zhang, Quincy, MA (US); Victor Renjie Fu, New York, NY (US); Tiancong Zhou, Sammamish, WA (US); Anirudhan Vijayakanthan, Bellevue, WA (US); Victor Macêdo Alexandrino, Viçosa-MG (BR); Ke Wang, Redmond, WA (US); Ahmed Hassan Mohamed, Bellevue, WA (US); Kushal Manohar Aurangabadkar, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 18/367,211

(22) Filed: Sep. 12, 2023

(65) Prior Publication Data
US 2025/0088435 A1    Mar. 13, 2025

(51) Int. Cl.
*G06F 15/173* (2006.01)
*G06Q 10/1093* (2023.01)
*H04L 41/50* (2022.01)
*H04L 41/5009* (2022.01)

(52) U.S. Cl.
CPC ..... *H04L 41/5012* (2013.01); *G06Q 10/1093* (2013.01); *H04L 41/5029* (2013.01)

(58) Field of Classification Search
CPC ............ H04L 41/5012; H04L 41/5029; G06Q 10/1093
See application file for complete search history.

(56) References Cited

U.S. PATENT DOCUMENTS

2013/0305083 A1* 11/2013 Machida ............... G06F 11/008
   714/4.1
2015/0095497 A1*  4/2015 Caputo ................... H04L 67/51
   709/226

OTHER PUBLICATIONS

Zhou, et al., "Informer: Beyond Efficient Transformer for Long Sequence Time-Series Forecasting", In Proceedings of the AAAI conference on artificial intelligence, vol. 35, Issue 12, May 18, 2021, pp. 11106-11115.

* cited by examiner

*Primary Examiner* — Joseph R Maniwang
(74) *Attorney, Agent, or Firm* — Ray Quinney & Nebeker P.C.; Paul N. Taylor

(57) ABSTRACT

The present disclosure relates to providing personalized service schedule in a computing network for a service provider to provide a service. In particular, the systems described herein utilize signal history of a plurality of users to train a model and to predict a cumulative signal amount for an individual user for a predetermined time frame in the future by drawing inferences from the model. The system described herein further transforms the predicted cumulative signal amounts to activity data and a personalized service schedule for the individual user may be updated based on the predicted activity data. The personalized service schedule may be utilized by disabling the service, or pausing the service or pausing a feature of the service when the predicted activity data indicates that the user is likely to be inactive.

20 Claims, 10 Drawing Sheets

PERSONALIZED SERVICE SCHEDULING

BACKGROUND

Cloud computing provides many benefits, such as flexibility, scalability, and cost-effectiveness. Cloud-based services are ideal for businesses growing or fluctuating bandwidth demands.

BRIEF SUMMARY

In some embodiments, a method for providing a personalized service schedule in a computing network for a service provider to provide a service is provided. The method includes receiving most recent signal history and a related contextual feature information of an individual user, wherein the signal history relates to service usage. The method includes receiving contextual feature information of the individual user for a predetermined time frame in the future. The method includes grouping the most recent signal history and the related contextual feature information into a plurality of fixed time buckets. The method includes predicting a cumulative signal amount for the individual user for a plurality of fixed time bucket over the predetermined time frame in the future by drawing inferences from a model by passing to the model the grouped most recent signal history and the related contextual feature information of the individual user, and the contextual feature information of the individual user for a predetermined time frame in the future. The method includes transforming the predicted cumulative signal amount of each of the plurality of fixed time buckets into a predicted activity data, where the predicted activity data indicates whether the individual user is likely to be active or inactive. The method includes updating the personalized service schedule for the individual user based on the predicted activity data of the individual user.

In other embodiments, a non-transitory computer-readable medium can include instructions that, when executed by one or more processors, cause a computing device to perform the methods described above. In still further embodiments, a system can perform the methods as described above.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 4 illustrates an example of individual signals and related contextual feature information, in accordance with one or more embodiments.

FIG. 5 illustrates an example of individual signals and related contextual feature information being grouped into one-hour fixed time buckets, in accordance with one or more embodiments.

DETAILED DESCRIPTION

Figure 1:
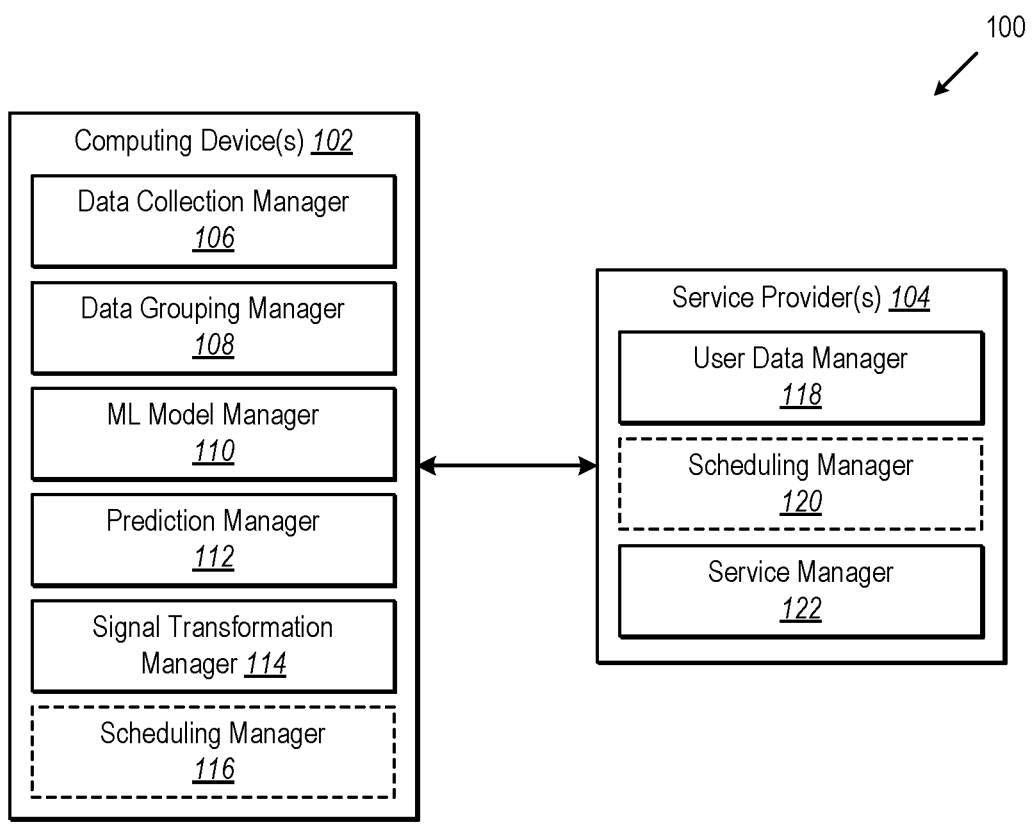
FIG. 1 illustrates an example environment showing systems and devices implemented in a cloud computing network, in accordance with one or more embodiments.

This disclosure generally relates to providing personalized service schedule in a computing network. Cloud computing systems have the capability to support and host a wide variety of services. This ability to support and host services presents management and operational challenges. Service providers are providing services 24/7 even when user(s) are not using them. This may increase costs for providing the service to the users. Resources may be held in situations where there is no need for it, and where services could be closed for a period of time, or where features of the service could be paused. When cloud-based services are not used, it may be desirable to disable or pause providing the services or disabling or pausing some features of the service.

As illustrated in the foregoing discussion, the present disclosure utilizes a variety of terms to describe features and/or advantages of the present disclosure herein. Additional detail is now provided regarding the meaning of some example terms.

In an example, a computing device refers to a computing system in a datacenter. A datacenter is a physical facility that typically includes a large number of computing systems (e.g., servers), which can be stacked in racks that are placed in rows. An entity that owns and/or operates a datacenter can be referred to as a cloud computing provider.

In an example, a service provider may refer to an entity providing services to a user. These services are implemented on a cloud computing system located in a datacenter. In one or more embodiments, a service provider may be a third-party who is paying the cloud computing provider to use their computing devices to provide services to users. For example, an application developer may implement their application on a server provided by a cloud computing provider and provide access to potential users who wish to use such an application. In one or more embodiments, a service provider may be the cloud computing provider who is providing services to users. For example, Microsoft is a cloud computing provider who also provides services, such as Microsoft 365. Microsoft 365 is a cloud-based subscription service that provides users with Word, Excel, PowerPoint, Outlook, SharePoint, OneDrive, and other services.

In an example, a signal may refer to any action taken while using a service. For example, if the service is an email application, a signal may include actions such as reading an email, sending an email, saving a draft email, modifying an email account settings, etc. If, for example, the service is a document sharing service, a signal may include editing a document, uploading and/or downloading a document, sharing a document, etc. In one or more embodiments, a service may provide various different services by a single application. For example, an application may provide email, calendar, and chat functionalities. In this example, an action that constitutes as a signal may be reading an email, sending an email, saving a draft email, modifying an email account settings, drafting a calendar invitation, sending a calendar invitation, accepting a calendar invitation, editing a calendar invitation, sending a chat message, receiving a chat message, drafting a chat message, etc. An individual signal may refer to a single signal that was created when an action took place, and the corresponding timestamp of the signal. The timestamp may include the time and/or time and date when the signal was created.

In an example, contextual feature information may refer to a day information, such as Monday, Tuesday, Wednesday, etc. In one or more embodiments, contextual feature information may refer to a week information, such as the number of the week (e.g., week 1, week 2, week 3, etc.) in a calendar year. In one or more embodiments, contextual feature information may refer to a month information, such as January, February, March, etc. In one or more embodiments, contextual feature information may refer to a holiday information, such as whether or not the day in question is a federal holiday, state holiday, national holiday, regional holiday, or not a holiday. In one or more embodiments, contextual feature information may refer to a calendar information, such as meeting, free (for example, no meeting), busy, out of office, tentative, etc. In one or more embodiments, contextual feature information may refer to a user information, such as the region in which the user is located, such as UK-Europe, California-USA, London-UK-Europe, Los Angeles-California-USA, etc. In one or more embodiments, contextual feature information may refer to a user type, such as business user or private user, adult user, or underage user, etc. In one or more embodiments, a contextual feature information may include one or more of the day information, the week information, the month information, the holiday information, the calendar information, the user information, and the user type information.

The features and functionalities described herein provide a number of advantages and benefits over conventional approaches and systems. For example, the systems described herein provide features and functionality related to coordinating downtime for servers based on users estimated activity. Indeed, the systems described here provide estimating individual users service usage by utilizing a ML model trained on signal history data of a plurality of users. This estimated service usage in turn may be converted into estimated activity or inactivity, which may be used to update service schedule for a particular service. One possible advantage of providing personalized service schedule is to allow the service provider to disable or pause the service or a feature of the service during those hours that the personalized service schedule indicates that the user will be inactive. Disabling or pausing the service or a feature of the service may save resources during inactive times. Additionally, disabling or pausing the service or a feature of the service may provide cost benefits for the service provider and/or the user.

Another possible advantage of training a ML model trained with signal history data of a plurality of users is that in case the service is new, or the user using the service is new. For example, when an individual user using the service is new, there may not be enough data to properly train a ML model with only that user's signal data. Hence training a ML model with signal data from a plurality of users using that service may provide more reliable predictions. Similarly, if the service is new, there may not be enough signal data to train a ML model with signal data of using that specific service. Hence training a ML model with signal data from different services may provide more reliable predictions.

Yet, another possible advantage of training the ML model with signal history data from plurality of users is that a single ML model may predict plurality of different users' activity. Hence, instead of storing a plurality of different ML models for a plurality of users, only one ML model is needed. This may save storage space and resources as only one ML model is kept up-to-date and stored by the system.

FIG. 1 illustrates an example environment 100 showing systems and devices that may be implemented in a cloud computing network. As shown in FIG. 1, the environment 100 includes one or more computing devices 102 and one or more service providers 104 in communication with one another. In the example shown in FIG. 1, the environment 100 includes a data collection manager 106, a data grouping manager 108, a model manager 110, a prediction manager 112, and a signal transformation manager 114, implemented on a computing device(s) 102. In one or more embodiments, the data collection manager 106, the data grouping manager 108, the model manager 110, the prediction manager 112, and the signal transformation manager 114 may be stored on a same computing device 102. In one or more embodiments, one or more of the data collection manager 106, the data grouping manager 108, the model manager 110, the prediction manager 112, and the signal transformation manager 114, may be stored on two or more separate computing devices 102. In the example shown in FIG. 1, the environment 100 further includes a user data manager 118, and a service manager 122 implemented on a service provider 104. As further shown, a scheduling manager may be implemented either on the computing device 102 (as scheduling manager 116) or on the service provider 104 (as scheduling manager 120).

In one or more embodiments, the data collection manager 106 may be configured to receive signal history of a plurality of users relating to a service usage. For example, a service provider 104 could share signal history data of the plurality of users with a timestamp information with the data collection manager 106. In one or more embodiments, the signal history may include all signals registered by the service provider 104 during a long period of time, such as one or more years. In some embodiments, the signal history may include all signals registered by the service provider 104 during a period of time, such as one or more months. In one or more embodiments, the data collection manager 106 may be configured to receive the most recent signal history of an individual user. For example, the data collection manager 106 may receive an individual user's signal history from the past one or more weeks. In yet, another example, the data collection manager 106 may receive an individual user's signal history from the past one or more months. In one or more embodiments, the data collection manager 106 may request signal data from a service provider 104, and as a response the service provider 104 may send such data to the data collection manager 106. Additional examples regarding signal data are provided in connection to FIGS. 3-5. In one or more embodiments, the data collection manager 106 may receive signal history of the plurality of users relating to two or more service usage.

In one or more embodiments, the data collection manager 106 may be configured to receive contextual feature information. In one or more embodiments, the contextual feature information may be related to the received signal data. For example, the contextual feature information may indicate a day, a week, and a month when the signal was created. In another example, the contextual feature information may indicate holiday information, calendar information, user information, and/or a user type information when the signal was created. In yet another example the contextual feature information may include one or more of the day, the week, the month, the holiday, the calendar, the user, and the user type information. In one or more embodiments, the data collection manager 106 may be configured to receive contextual feature information of an individual user for a predetermined time frame in the future, as further discussed in connection to FIG. 2B.

In one or more embodiments, the data grouping manager 108 may be configured to group the signal data and the related contextual feature information into a plurality of fixed time buckets, as further discussed in connection with FIG. 5. For example, a fixed time bucket may be an hour long, thus each day would include 24 fixed time buckets, each an hour long. The data grouping manager 108 may group each signal to a corresponding time bucket based on when the signal was created. For example, if there were five signals created during 1 PM and 2 PM, those five signals will be included in the same fixed time bucket. The data grouping manager 108 will also include the contextual feature information relating to each signal in the corresponding fixed time bucket as well. In one or more embodiments, a fixed time bucket may be two hours long, in which case each day would include 12 fixed time buckets. In one or more embodiments, a fixed time bucket may be thirty minutes long, in which case each day will include 48 fixed time buckets. In one or more embodiments, a fixed time bucket may be six hours long, in which case each day will include four fixed time buckets. In one or more embodiments, a fixed time bucket may be one day (24 hours long), in which case each month will include 28-31 fixed time buckets. For example, if a service is such that users will access it only during specific time of the week/month/year, the length of the fixed time bucket may be longer as well. In one or more embodiments, a fixed time bucket may be one week long, one month long, one year long, etc. In one or more embodiments, the fixed time bucket may be a very short time period. For example, the fixed time bucket may be 5 minutes long, 1 minute long, 1 second long, 1 ms long, etc. This may be beneficial in situations where the user of the service is another service provider who periodically requires information from the first service provider.

In one or more embodiments, the model manager 110 may be configured to train a model based on the grouped signal history and the related contextual feature information of a plurality of users. For example, the model manager may use various different statistical analysis tools to create a model that may be later used to predict future signal amounts. In one or more embodiments, the model manager may train a machine learning (ML) model. In one or more embodiments, a long sequence time-series forecasting (LSTF) model is built based on the signal history and the related contextual feature information of the plurality of users. A transformer is one example of a neural network architecture that can be employed in various aspects of time-series analysis. An informer is another type of neural network architecture which utilizes a transformer-based model specifically for LSTF. The informer includes an encoder and a decoder component, which may be implemented by the model manager 110. In one or more embodiments, the model manager 110 may include the encoder component for training an informer-based model to forecast long sequences of signal amount. For example, the model manager (i.e., the encoder component) will receive as input a massive sequence of signals, and the model manager is configured to distill information from these past sequences. In one or more embodiments, the model manager 110 may include the decoder component that generates the model based on the received inputs.

In one or more embodiments, the prediction manager 112 includes the encoder and the decoder component of the informer-based model. The prediction manager may have access to the model generated by the model manager 110 with the signal history data and the related contextual feature information of the plurality of users. In one or more embodiments, the prediction manager 112 may be configured to input to the model the grouped most recent signal history and the related contextual feature information of an individual user, and the contextual feature information of the individual user for a predetermined time frame in the future. The prediction manager 112 may then receive the predicted cumulative signal amount for the individual user for a plurality of fixed time buckets over the predetermined time frame in the future, as further discussed in connection to FIG. 6.

In one or more embodiments, the signal transformation manager 114 may be configured to transform the predicted cumulative signal amount for each of the plurality of fixed time buckets into a predicted activity data. The predicted activity data will indicate whether the individual user is likely to be active or inactive during the time indicated by the time bucket. For example, a fixed time bucket may be classified as active or as inactive. In one or more embodiments, the threshold for classifying a fixed time bucket to active will be one signal. For example, if the predicted signal amount is one or more, the signal transformation manager 114 will transform it as active, otherwise the signal transformation manager 114 will transform it as inactive. In one or more embodiments, the threshold for classifying a fixed time bucket to active will be more than one signal. For example, if the predicted signal amount is two or less, the signal transformation manager 114 will transform it as inactive, but if the predicted signal amount is three or more, the signal transformation manager 114 will transform it as active. The threshold for transforming a signal amount into active may be set individually for each service and/or for each individual user.

In one or more embodiments, the user data manager 118 is configured to provide signal data to the data collection manager 106. In one or more embodiments, the data collection manager 106 may request signal data from the user data manager 118. In one or more embodiments, the user data manager 118 may receive a request from a service manager 122 to provide signal data to the data collection manager 106. The user data manager 118 may be configured to collect and/or store signal data from all the users using the service provider's 104 services. In one or more embodiments, the user data manager 118 may be configured to set the actions that create a signal. For example, the user data manager 118 for a shared document application may set that a signal is created when a user saves a new shared document, shares a document, or edits a document. In another example, the user data manager 118 for a shared document application may set that a signal is created for each new character that is inputted for a shared document.

In one or more embodiments a scheduling manager 116 or a scheduling manager 120 may be configured to update a personalized service schedule for the individual user based on the predicted activity data received from the signal transformation manager 114. The scheduling manager 116 or the scheduling manager 120 may then provide the updated personalized service schedule to a service manager 122 at the service provider 104. For example, the updated personalized service schedule will include predictions on whether the individual user will be active or inactive in using the service provided by the service provider 104 for each fixed time bucket over a predetermined period of time in the future, as further discussed in connection to FIG. 7.

In one or more embodiments, the service manager 122 is configured to use the personalized service schedule to disable the service, to pause a service, or disabling or pausing one or more features of the service when the service schedule indicates that the individual user will be inactive in a period of time. For example, the service manager 122 may hibernate the service on a cloud computing system. In another example, the service manager 122 may disable syncing between two or more servers. Similarly, the service manager 122 may enable service or enable a feature of the service at a time when the personalized service schedule indicates that the user will become active again, or a predetermined time period before the personalized service schedule indicates that the user will become active again. For example, if the personalized service schedule indicates that the individual user is inactive during 9 PM and 9 AM, and active during 9 AM and 9 PM, the service manager 122 may disable the service after 9 PM and enable the service on or before 9 AM.

Figure 2A:
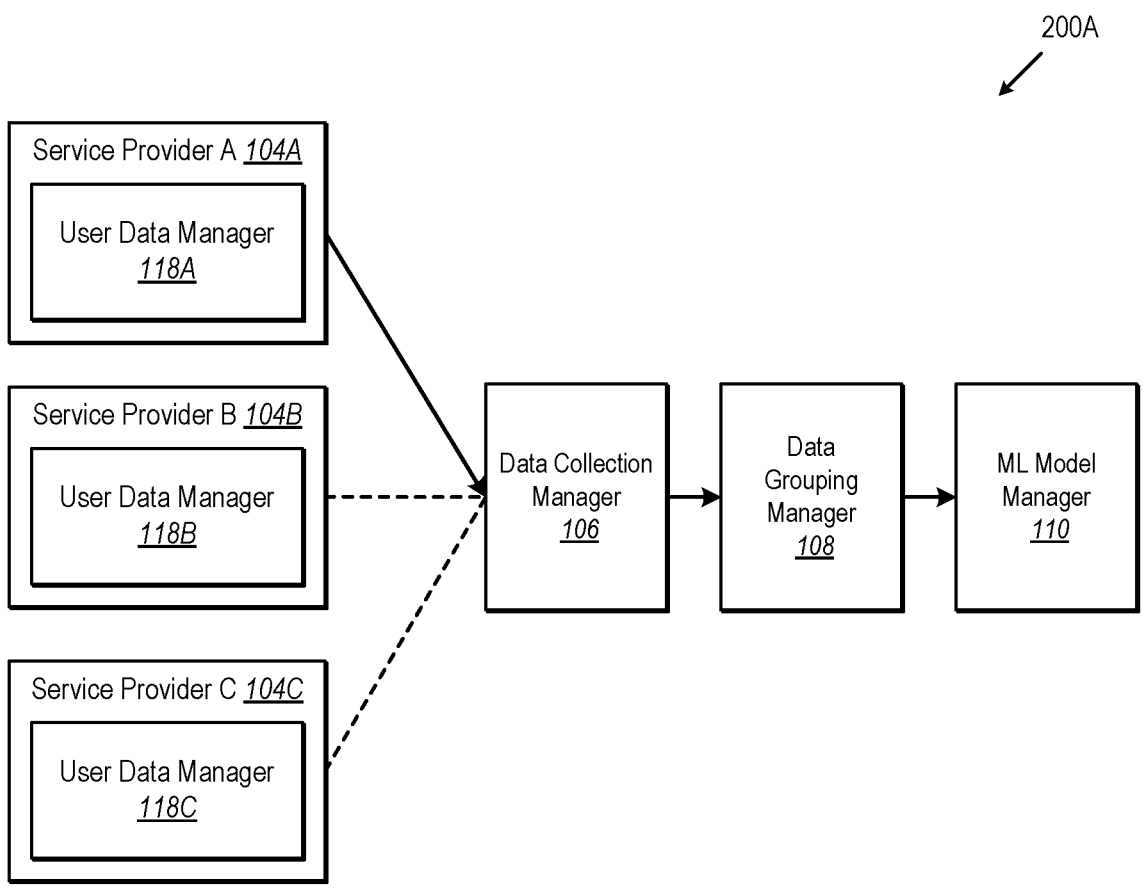
FIG. 2A is a diagram illustrating an example workflow of a possible implementation for training a ML model that may be used to predict signal amounts for an individual user using a service, in accordance with one or more embodiments.

FIG. 2A is a diagram 200A illustrating an example workflow of a possible implementation for training a ML model that may be used to predict signal amounts for an individual user using a service, in accordance with one or more embodiments. As shown in FIG. 2A, service provider A 104A may provide signal history data and related contextual feature information of a plurality of users that relates to the usage of service provided by service provider A 104A. In one or more embodiments, two or more service providers may provide signal history data and related contextual feature information of a plurality of users that relates to the usage of service provided by each of the two or more service providers. For example, in FIG. 2A, service provider B 104B and service provider C 104C may also provide signal history data and related contextual feature information of a plurality of users that relates to the usage of service provided by service provider B 104B and service provider C 104C respectfully.

In one or more embodiments, the signal history and the related contextual feature information received from plurality of service providers may include different length signal history and related contextual feature information. For example, service provider A 104A may provide signal history data and related contextual feature information from the previous month, while service provider B 104B and service provider C 104C may provide data from the previous one year or two years. This may be beneficial in situations where the users of service A, service B, and service C are common, and/or the services (service A, B, and C) are typically used together. For example, service A (provided by service provider A 104A) may be a new service that does not have a long signal history data, hence the ML model trained with signal data from all three service providers may be beneficial to predict the usage of the new service A.

In one or more embodiments, service provider A 104A may have different contextual feature information relating to the signal history it provides to the data collection manager 106, than what service provider B 104B may provide. For example, service provider A 104A may include only day, week, and month information, while service provider B 104B may include day, week, month, holiday, and calendar information. In one or more embodiments, different service providers may provide different length signal history data and related contextual feature information that includes some differences in the content. For example, service provider A 104A may provide signal history data and related contextual feature information from the prior two months with day, week, and month information, service provider B 104B may provide signal history data and related contextual feature information from the prior six months with day, week, month, and holiday information, and service provider C 104C may provide signal history data and related contextual feature information from the prior fifteen months with day, week, month, and user type information.

In one or more embodiments, the data collection manager 106 may request signal data and the related contextual feature information from a single service provider, or from a plurality of service providers. The data collection manager 106 may then deliver the received signal history and the related contextual feature information to the data grouping manager 108.

In one or more embodiments, the data grouping manager 108 may be configured to group the signal history data and the related contextual feature information into a plurality of fixed time buckets, as further discussed in connection with FIG. 5. For example, a fixed time bucket may be an hour long, thus each day would include 24 fixed time buckets, each an hour long. The data grouping manager 108 may group each signal to a corresponding time bucket based on when the signal was created. For example, if the fixed time bucket is one hour long and there were five signals created during 1 PM and 2 PM, those five signals will be included in the same fixed time bucket. The data grouping manager 108 will also include the contextual feature information relating to each signal in the corresponding fixed time bucket as well. In one or more embodiments, a fixed time bucket may be shorter than one hour long, or longer than one hour long.

In one or more embodiments, one or more of the time buckets may be empty. For example, if there were no signals created on a particular day between 12 AM and 7 AM, then each of the seven one hour-long time buckets (12 AM to 1 AM, 1 AM to 2 AM, 2 AM to 3 AM, 3 AM to 4 AM, 4 AM to 5 AM, 5 AM to 6 AM, and 6 AM to 7 AM) will be empty.

The data grouping manager 108 will then deliver the grouped signal history and the related contextual feature information to the model manager 110. In one or more embodiments, the model manager 110 may be configured to train a model based on the grouped signal history and the related contextual feature information of a plurality of users. In one or more embodiments, the model may be a machine learning (ML) model. For example, the model manager may use various different statistical analysis tools to create a model that may be later used to predict future signal amounts. In one or more embodiments, a long sequence time-series forecasting (LSTF) model is built based on the signal history and the related contextual feature information of a plurality of users. A transformer is one example of a neural network architecture that can be employed in various aspects of time-series analysis. An informer is another type of neural network architecture which utilizes a transformer-based model specifically for LSTF. The informer includes an encoder and a decoder component, which may be implemented by the model manager 110. In one or more embodiments, the model manager 110 may include the encoder and decoder component, as previously discussed in connection to FIG. 1, for training an informer-based model. For example, the model manager 110 may receive a long sequence of signal amounts in fixed time buckets from the data grouping manager 108 and may use the data to train an informer-based model.

Figure 2B:
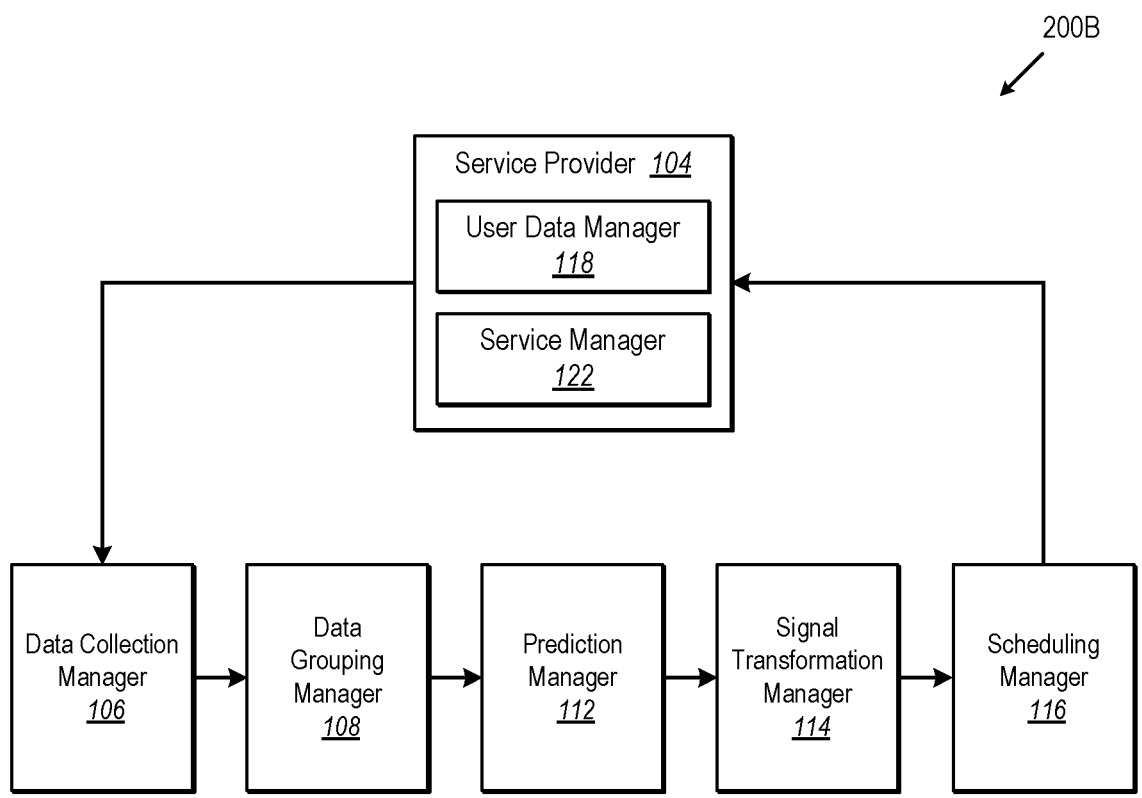
FIG. 2B is a diagram illustrating an example workflow of a possible implementation for providing a personalized service schedule to a service provider by utilizing a ML model, in accordance with one or more embodiments.

FIG. 2B is a diagram 200B illustrating an example workflow of possible implementation for providing a personalized service schedule to a service provider by utilizing a model, in accordance with one or more embodiments. After training the model, as discussed in connection to FIG. 2A, the model may then be utilized as shown in FIG. 2B.

A service manager 122 may request the one or more computing devices 102 to provide a service schedule (or update a preexisting service schedule) for an individual user of the service provided by the service provider 104. In one or more embodiments, the data collection manager 106 may send a request to the user data manager 118 to provide the individual user's most recent history data, the related contextual feature information, and the contextual feature information of the Individual user for a predetermined time frame in the future. For example, the user data manager 118 may provide to the data collection manager 106 the individual user's last three weeks signal history with the related contextual feature information, and also the individual user's contextual feature information for the next seven days.

The data collection manager 106 may then provide the individual user's most recent signal history data, the related contextual feature information, and the contextual feature information of the individual user for a predetermined time frame in the future to the data grouping manager 108. The data grouping manager 108 may group the signal data and the related contextual feature information into a plurality of fixed time buckets, as further discussed in connection with FIG. 5. A Fixed time bucket may be 20 min long, 30 min long, one hour long, two hours long, or anything between 20 min and two hours. In some embodiments, the fixed time bucket may be shorter than 20 min, or longer than two hours long. The data grouping manager 108 may group each signal from the most recent signal history data to a corresponding time bucket based on when the signal was created. For example, if the most recent signal history data includes the last three weeks of signal history data, the data grouping manager 108 would create 252 two hour long fixed time buckets, 504 one hour long fixed time buckets, 1008 30 min long fixed time buckets, or 1512 20 min long fixed time buckets. The data grouping manager 108 would then group each individual signal of the most recent signal history data to a corresponding time bucket together with the contextual feature information.

The data grouping manager 108 may then deliver the grouped most recent signal history with the related contextual feature information, and the contextual feature information of the individual user for a predetermined time frame in the future to the prediction manager 112. In one or more embodiments, the prediction manager 112 includes the encoder and the decoder component of the informer-based model as previously discussed in connection to FIGS. 1, and 2A. In one or more embodiments, the prediction manager 112 may be configured to input to the model, the received grouped most recent signal history and the related contextual feature information of an individual user, and the contextual feature information of the individual user for a predetermined time frame in the future. The prediction manager 112 may then receive from the model the predicted cumulative signal amount for the individual user for a plurality of fixed time buckets over the predetermined time frame in the future, as further discussed in connection to FIG. 6. For example, if the predetermined time frame in the future is 7 days, the prediction would provide 84 predictions for two-hour fixed time buckets, 168 predictions for one-hour fixed time buckets, 336 predictions for 30 min fixed time buckets, or 504 predictions for 20 min fixed time buckets.

The prediction manager 112 may then deliver the predicted cumulative signal amount to the signal transformation manager 114. The signal transformation manager 114 may then transform the predicted cumulative signal amount for each of the plurality of fixed time buckets into a predicted activity data. The predicted activity data will indicate whether the individual user is likely to be active or inactive during the time indicated by the time bucket. For example, a fixed time bucket may be classified as active or as inactive. In one or more embodiments, the threshold for classifying a fixed time bucket to active will be one signal. For example, if the predicted signal amount is one or more, the signal transformation manager 114 will transform it as active, otherwise the signal transformation manager 114 will transform it as inactive. In one or more embodiments, the threshold for classifying a fixed time bucket to active will be more than one signal. For example, if the predicted signal amount is two or less, the signal transformation manager 114 will transform it as inactive, but if the predicted signal amount is three or more, the signal transformation manager 114 will transform it as active. The threshold for transforming a signal amount into active may be set individually for each service and/or for each individual user.

The signal transformation manager 114 may then deliver the predicted activity data to the scheduling manager 116. The scheduling manager 116 may update a personalized service schedule for the individual user based on the predicted activity data. The personalized service schedule will indicate for each fixed time buckets for a predetermined time frame in the future whether the individual user is likely to be active or inactive in the service usage.

The scheduling manager 116 may then deliver the personalized service schedule to the service manager 122 which may use the personalized service schedule to take actions on the services provided by the service provider 104. In one or more embodiments, the service manager 122 may disable the service, pause a service, or disable or pause one or more features of the service when the service schedule indicates that the individual user will be inactive in a period of time. For example, the service manager 122 may hibernate the service on a cloud computing system. In another example, the service manager 122 may disable syncing between two or more servers. Similarly, the service manager 122 may enable service or enable a feature of the service at a time when the personalized service schedule indicates that the user will become active again, or a predetermined time period before the personalized service schedule indicates that the user will become active again. For example, if the personalized service schedule indicates that the individual user is inactive during 9 PM and 9 AM, and active during 9 AM and 9 PM, the service manager 122 may disable the service after 9 PM and enable the service on or before 9 AM. In another example, the service manager 122 may initiate caching for a feature of the service to be completed ahead of the time when the personalized service schedule indicates that the individual user will be active.

Figure 3:
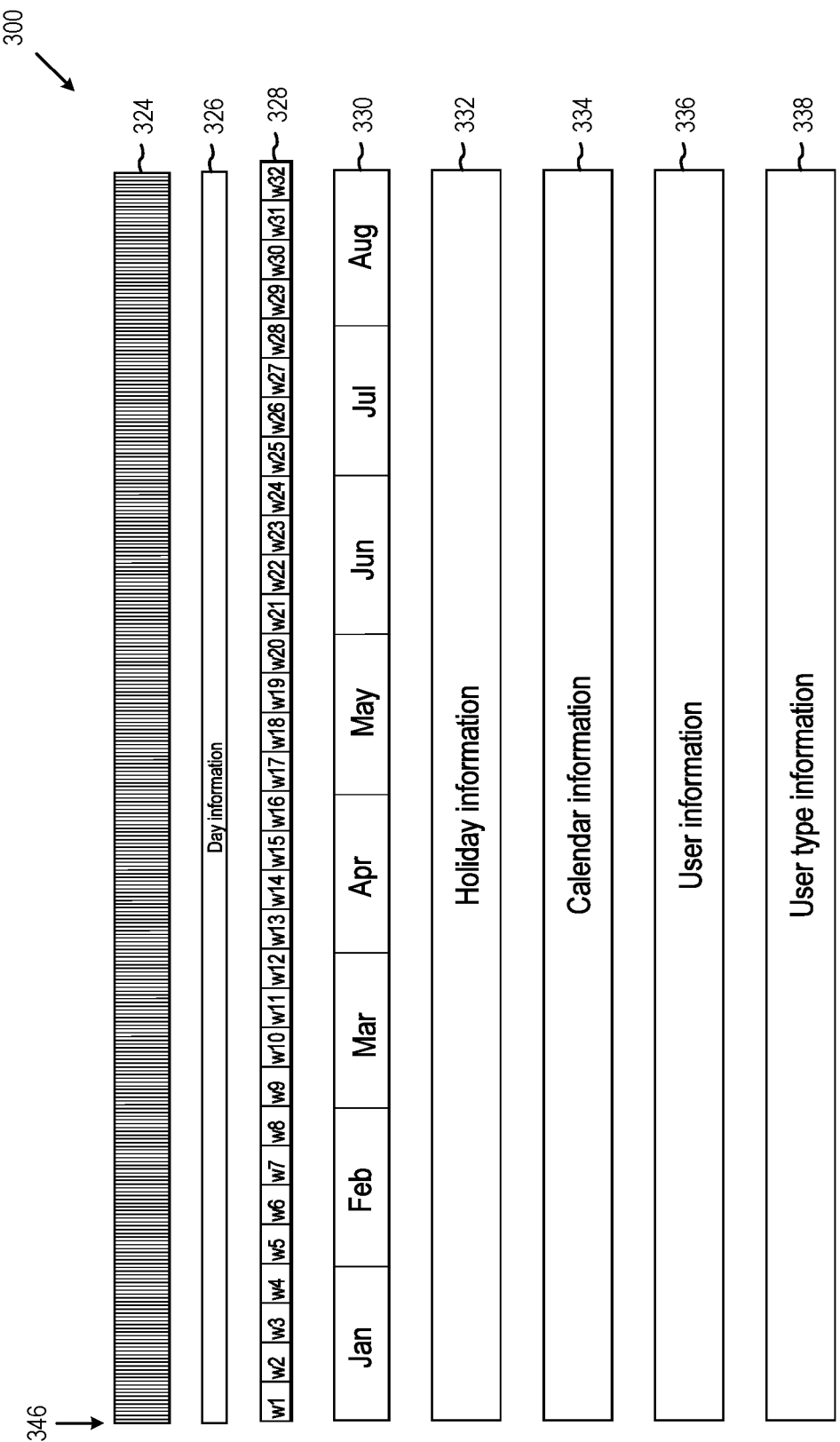
FIG. 3 illustrates an example of signal history data and related contextual feature information, in accordance with one or more embodiments.

FIG. 3 illustrates an example 300 of signal history data and related contextual feature information, in accordance with one or more embodiments. As shown in in FIG. 3, the signal history 324 includes a plurality of signal data from a single user of a service that may be delivered to the data collection manager 106. The related contextual feature information, according to FIG. 3, includes day information 326, week information 328, month information 330, holiday information 332, calendar information 334, user information 336, and user type information 338. The month information 330 in FIG. 3 indicates that the signal history 324 includes a user's signals from eight consecutive months (January to August). A very small subset (shown by arrow 346) of the signal history data and related contextual feature information is shown on FIG. 4. FIG. 3 illustrates the signal history data and related contextual feature information of a single user that a data collection manager 106 may receive from a service provider 104. It should be noted, that when the model is being trained, the data collection manager 106 may receive these signal history data and related contextual feature information data of a plurality of users from one or more service providers 104.

Figure 4:
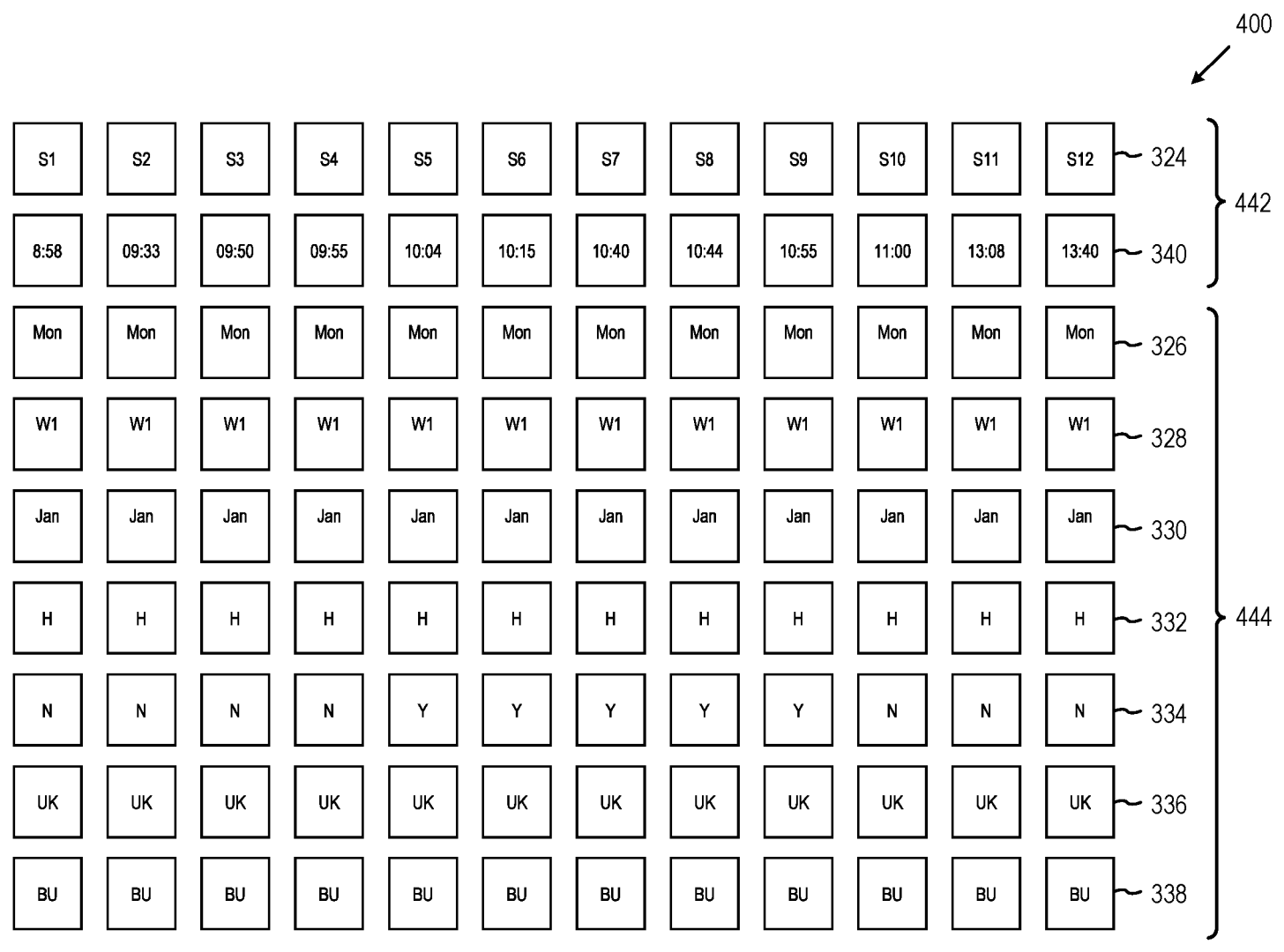

FIG. 4 illustrates an example 400 of individual signals 442 and related contextual feature information 444, in accordance with one or more embodiments. The example 400 shown in FIG. 4 may be a small subset of the signal history and related contextual feature information shown in FIG. 3. The example 400 illustrates all individual signals from a single day (in this example, January 1st). The example shown in FIG. 4 includes 12 individual signals 324 (S1, S2, S3, S4, S5, S6, S7, S8, S9, S10, S11, and S12) and their respective timestamps 340. The related contextual feature information 444 includes a day information 326, which in this sample is Monday. The related contextual feature information 444 also includes a week information 328 and a month information 330, which are Week 1 and January respectively, for all the 12 signals in the example. In the example shown in FIG. 4, the related contextual feature information further includes holiday information 332, calendar information 334, user information 336, and user type information 338. The user information 336 in this example provides that the user is located in the UK, and thus the timestamp 340 is local time in the UK. The user information 336 may also be used to identify whether or not the day in question is a holiday or not. In the example shown in FIG. 4, January $1^{st}$ is a holiday (New Year) in the UK, and therefore the holiday information 332 indicates that it is a holiday, for each of the individual signals 324. FIG. 4, for example, further provides that the user type information 338 is a business user (BU), rather than a private user of the service. Finally, the FIG. 4 shows the calendar information 334 that shows that during signals S5, S6, S7, S8, and S9, the user had a meeting (Y) in their calendar, while the rest of the time they did not have a meeting (N). FIG. 4 shows a small number of individual signals of the signal history 324 (shown on FIG. 3) together with the related contextual feature information that the data collection manager 106 may deliver to the data grouping manager 108.

Figure 5:
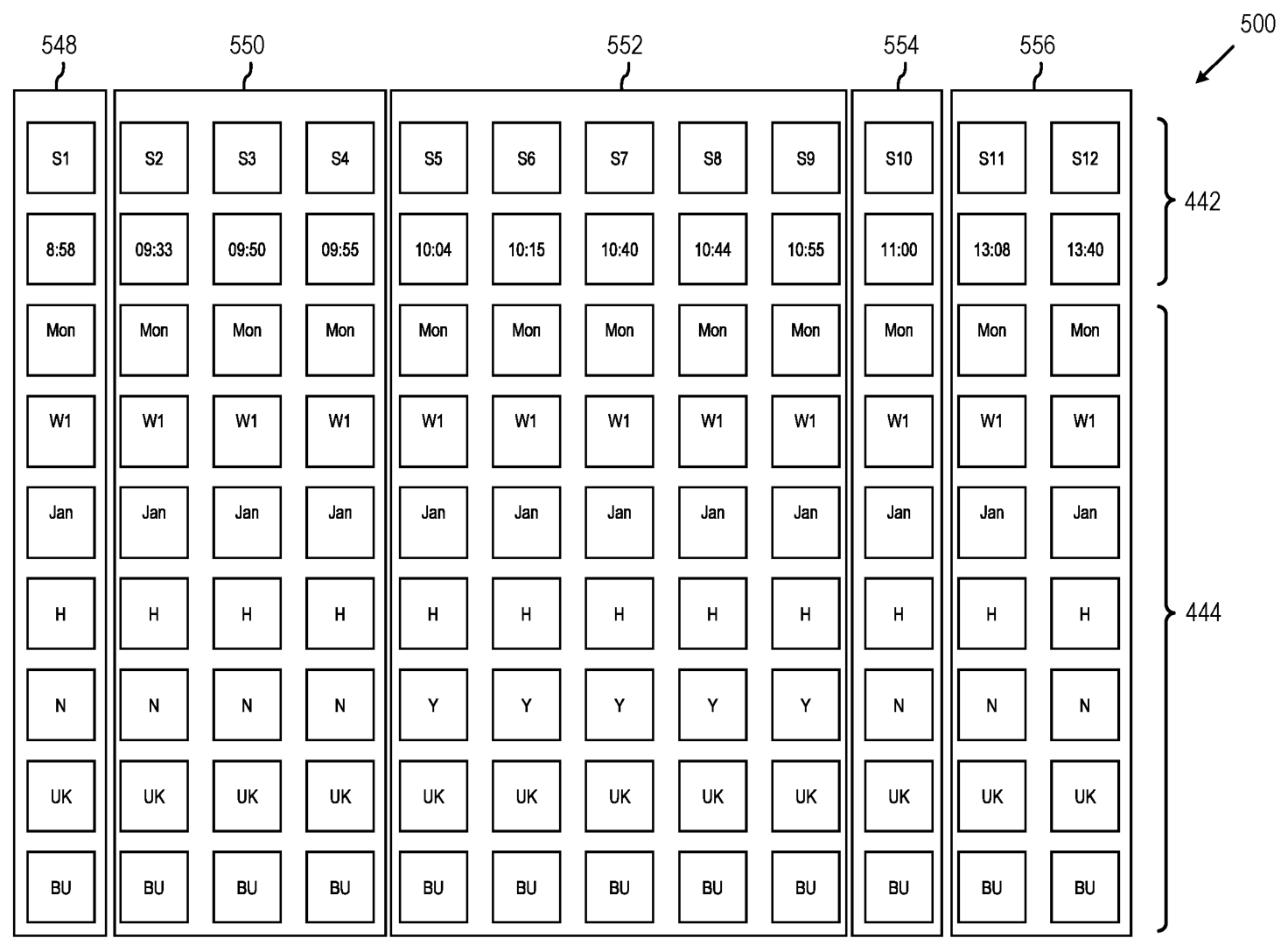

FIG. 5 illustrates an example 500 of individual signals 442 and related contextual feature information 444 being grouped into one-hour fixed time buckets, in accordance with one or more embodiments. As shown in FIG. 5, S1 is the only signal in the 8 AM to 9 AM time bucket 548, S2, S3, and S4 are together in the 9 AM to 10 AM time bucket 550, S5, S6, S7, S8, and S9 are together in the 10 AM to 11 AM time bucket 552, S10 is in the 11 AM to 12 PM time bucket 554, and S11 and S12 are in the 1 PM to 2 PM time bucket 556. Since there are no other signals recorded on that day, the rest of the time buckets will be empty for January $1^{st}$. These grouped signal history and the related contextual feature information of plurality of users may be transmitted by the data grouping manager 108 to the ML model manager 110 for training a ML model that may predict future signal amounts.

Figure 6:
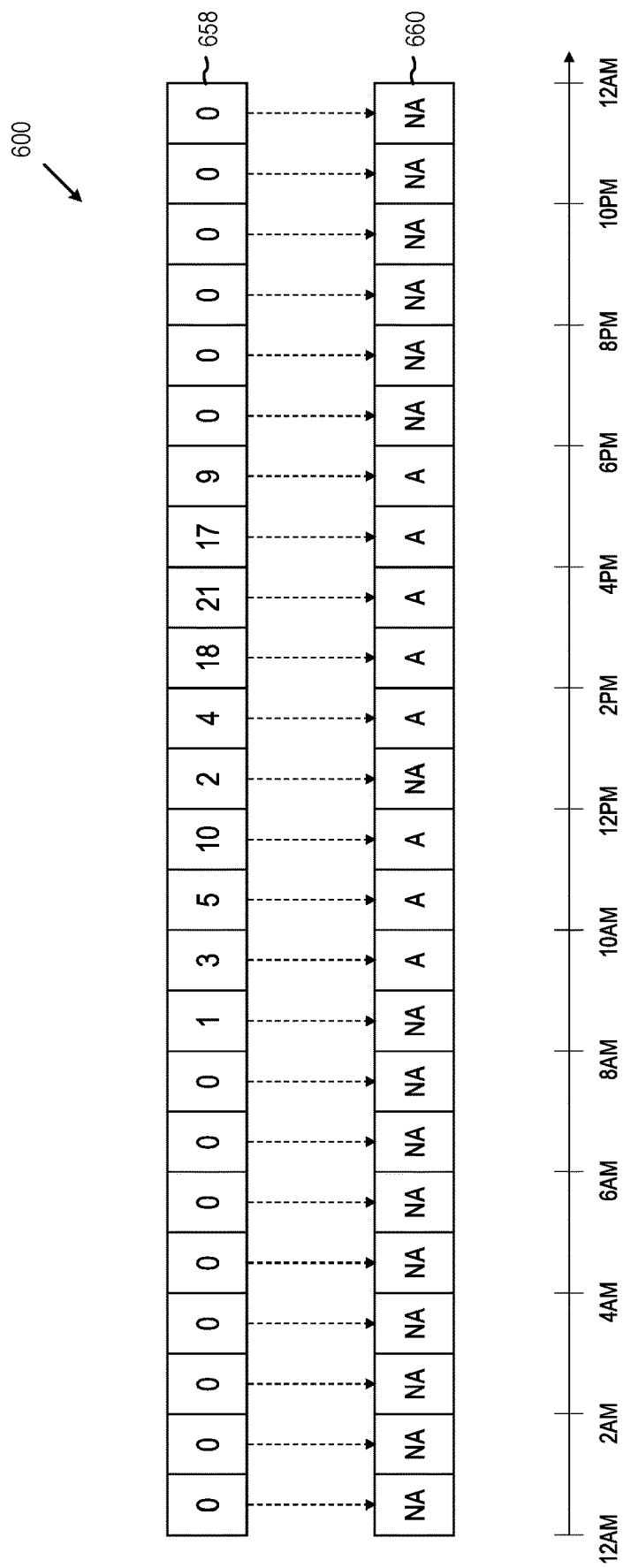
FIG. 6 illustrates an example of transforming a cumulative signal amount of each of the plurality of fixed time buckets into a predicted activity data, in accordance with one or more embodiments.

FIG. 6 illustrates an example 600 of transforming a predicted cumulative signal amount 658 of each of the plurality of fixed time buckets into a predicted activity data 660, in accordance with one or more embodiments. Once a prediction manager 112 has predicted a cumulative signal amount 658 for the individual user for a plurality of fixed time buckets over the predetermined time frame in the future, a signal transformation manager 114 may transform the predicted cumulative signal amounts 658 into predicted activity data 660, as shown in FIG. 6. In the example shown in FIG. 6, the fixed time period is one hour, and the predetermined time frame in the future is one day. Furthermore, the threshold used in FIG. 6 is 3 signals, meaning that if the time bucket has three or more signals, the signal transformation manager 114 will transform it into 'active' (A). When, on the other hand, the time bucket has two or less signals, the signal transformation manager 114 will transform it into 'inactive' (NA).

Figure 7:
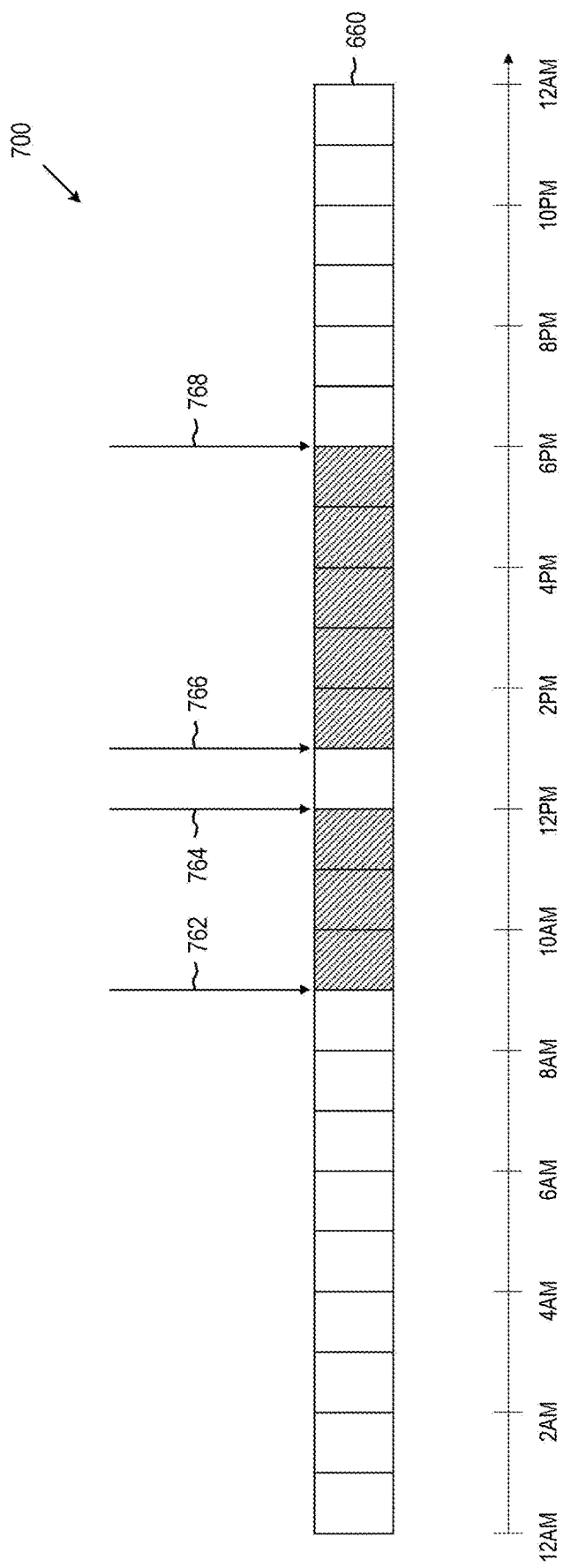
FIG. 7 illustrates an example of a personalized service schedule and actions that the service provider may take based on it, in accordance with one or more embodiments.

FIG. 7 illustrates an example 700 of personalized service schedule and actions that the service provider 104 may take based on it, in accordance with one or more embodiments. After the signal transformation manager 114 has transformed the predicted cumulative signals into predicted activity data 660, the scheduling manager 116 (or the scheduling manager 120) may use the predicted activity data 660 to generate (or update) a personalized service schedule for the individual user. As shown in FIG. 7, the personalized service schedule is showing the individual user will be active between 9 AM and 12 PM, and then again from 1 PM until 6 PM. The service provider 104 may take different actions at different times when the individual user's activity prediction changes. For example, on or around 9 AM, the service provider 104 may awake the service from hibernation mode 762. On or around 12 PM, the service provider 104 may pause syncing 764 or some other features of the service. On or around 1 PM, the service provider 104 may resume syncing 766 or some other paused features of the service.

And finally, on or around 6 PM, the service provider 104 may hibernate the service 768.

Figure 8:
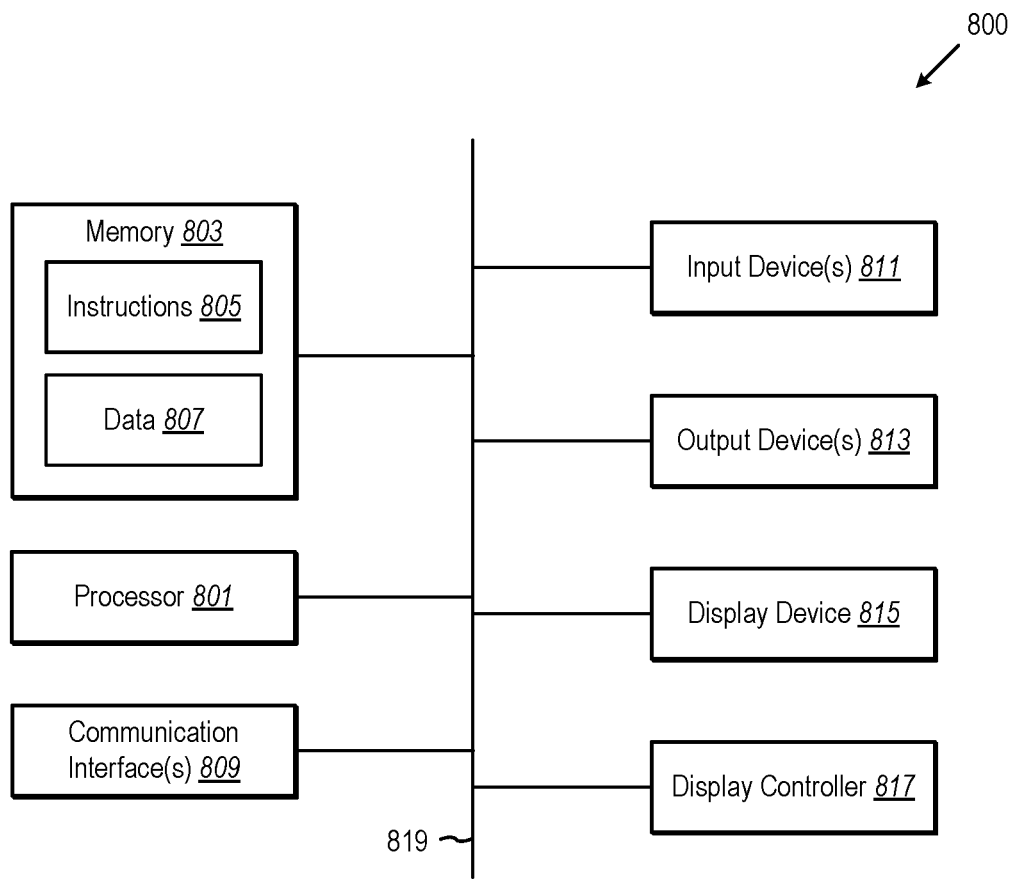
FIG. 8 illustrates certain components that may be included within a computer system, in accordance with one or more embodiments.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used. In one or more embodiments, the computer system 800 further includes one or more graphics processing units (GPUs), which can provide processing services related to both neural network training and graph generation.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

Figure 9:
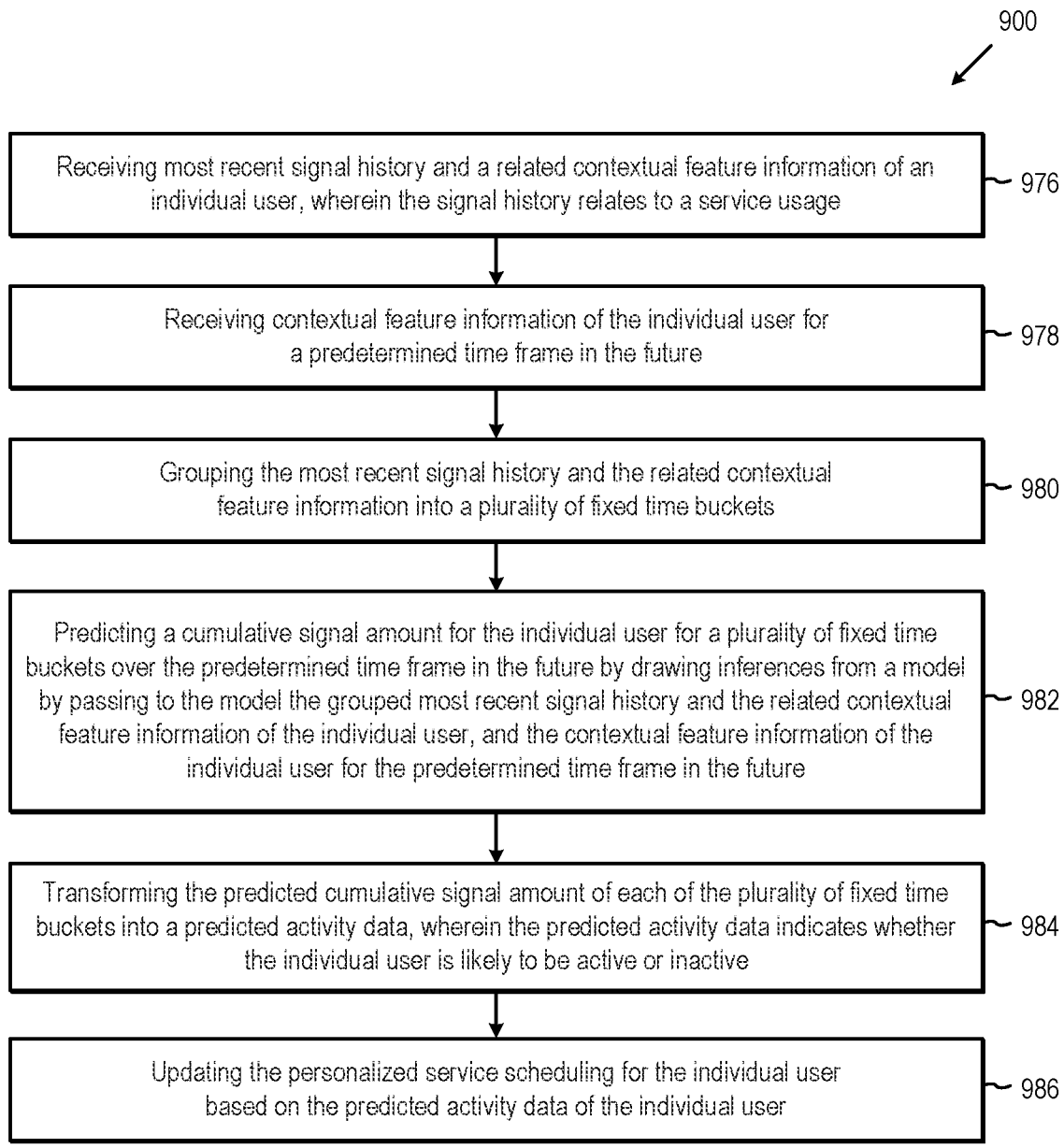
FIG. 9 illustrates a series of acts for providing a personalized service schedule in a computing network, in accordance with one or more embodiments.

FIG. 9 illustrates a series of acts 900 for providing personalized service schedule in a computing network, in accordance with one or more embodiments. While FIG. 9 illustrates acts according to one or more embodiments, alternative embodiments may omit, add to, reorder, and/or modify any of the acts shown in FIG. 9. The acts of FIG. 9 can be performed as part of a method. Alternatively, a non-transitory computer-readable medium can include instructions that, when executed by one or more processors, cause a computing device to perform the acts of FIG. 9. In still further embodiments, a system can perform the acts of FIG. 9.

As shown in FIG. 9, the series of acts 900 may include an act 976 of receiving most recent signal history and a related contextual feature information of an individual user, wherein the signal history relates to a service usage. In one or more embodiments, the contextual feature information may include one or more of a holiday information, a day information, a week information, a month information, a calendar information, a user information, and a user type information. For example, the calendar information may indicate a calendar event, the user information may indicate a region in which the user is located, and the user type information may indicate whether the individual is a business user or a personal/private user. In one or more embodiments, the most recent signal history may include a signal amount, and wherein each signal indicates an action taken while using the service. For example, the action taken may be one or more of sending an email, reading an email, sending a calendar invitation, accepting a calendar invitation, editing a presentation, sending a chat messages, receiving a chat message, and attending a call.

The series of acts 900 may also include an act 978 of receiving contextual feature information of the individual user for a predetermined time frame in the future. For example, if the prediction is for next seven days, the received contextual feature information for a predetermined time frame in the future should also include the next seven days.

The series of acts 900 may also include an act 980 of grouping the most recent signal history and the related contextual feature information into a plurality of fixed time buckets. A fixed time bucket may be 20 min long, 30 min long, one hour long, two hours long, or anything between 20 min and two hours. In some embodiments, the fixed time bucket may be less than 20 min, or more than two hours long. Each signal in the most recent signal history (and the corresponding contextual feature information) may then be grouped to a corresponding time bucket based on when the signal was created. For example, if there were five signals created during 1 PM and 2 PM, those five signals will be included in the same fixed time bucket. The contextual feature information relating to each signal may also be included in the corresponding fixed time bucket as well.

The series of acts 900 may also include an act 982 of predicting a cumulative signal amount for the individual user for a plurality of fixed time buckets over the predetermined time frame in the future by drawing inferences from a model by passing to the model the grouped most recent signal history and the related contextual feature information of the individual user, and the contextual feature information of the individual user for a predetermined time frame in the future. In one or more embodiments, the model is trained with signal history and related contextual feature information of plurality of users, wherein the signal history relates to the service usage. In one or more embodiments, the signal history, and the related contextual feature information of a plurality of users includes signal history relating to two or more service usages. In one or more embodiments, the signal history may include a signal amount, and wherein each signal indicates an action taken while using the service. For example, the action taken may be one or more of sending an email, reading an email, sending a calendar invitation, accepting a calendar invitation, editing a presentation, sending a chat messages, receiving a chat message, and attending a call.

In one or more embodiments, an informer-based model may be trained with the grouped signal history and the related contextual feature information. In one or more embodiments, the model may be machine learning (ML) model. For example, the ML model may receive as input a massive sequence of signals, and the ML model is configured to distill information from these past sequences.

The series of acts 900 may also include an act 984 of transforming the predicted cumulative signal amount of each of the plurality of fixed time buckets into a predicted activity data, wherein the predicted activity data indicates whether the individual user is likely to be active or inactive. In one or more embodiments, transforming the cumulative signal amount for each of the plurality of fixed time buckets into the predicted activity data may include using a threshold for the amount of signals that are needed to indicate whether the individual users is active.

The series of acts 900 may also include an act 986 of updating the personalized service schedule for the individual user based on the predicted activity data of the individual user. In one or more embodiments, the personalized service schedule may then be delivered to the service provider. In one or more embodiments, the personalized service schedule may be used for disabling the service when the predicted activity data indicates that the user is likely to be inactive. In one or more embodiments, the personalized service schedule may be used for pausing the service when the predicted activity data indicates that the user is likely to be inactive. In one or more embodiments, the personalized service schedule may be used for one or more of disabling, or pausing a feature of the service when the predicted activity data indicates that the user is likely to be inactive. In one or more embodiments, the personalized service schedule may be used for activating the service when the predicted activity data indicates that the user is likely to be active. In one or more embodiments, the personalized service schedule may be used for resuming the service when the predicted activity data indicates that the user is likely to be active. In one or more embodiments, the personalized service schedule may be used for resuming a feature of the service when the predicted activity data indicates that the user is likely to be active.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing a personalized service schedule in a computing network for a service provider to provide a service comprising:
   receiving most recent signal history and a related contextual feature information of an individual user, wherein the signal history relates to a service usage;
   receiving contextual feature information of the individual user for a predetermined time frame in the future;
   grouping the most recent signal history and the related contextual feature information into a plurality of fixed time buckets;
   predicting a cumulative signal amount for the individual user for a plurality of fixed time buckets over the predetermined time frame in the future by drawing inferences from a model by passing to the model the grouped most recent signal history and the related contextual feature information of the individual user, and the contextual feature information of the individual user for the predetermined time frame in the future;
   transforming the predicted cumulative signal amount of the plurality of fixed time buckets into a predicted activity data, wherein the predicted activity data indicates whether the individual user is likely to be active or inactive; and
   updating the personalized service schedule for the individual user based on the predicted activity data of the individual user.

2. The method of claim 1, wherein the personalized service schedule is delivered to the service provider.

3. The method of claim 1, wherein the personalized service schedule is used for one or more of disabling the service, pausing the service, or disabling or pausing a feature of the service when the predicted activity data indicates that the individual user is likely to be inactive.

4. The method of claim 3, wherein the feature is a syncing feature.

5. The method of claim 1, wherein the personalized service schedule is used for activating or resuming the service or a feature of the service when the predicted activity data indicates that the individual user is likely to be active.

6. The method of claim 1, wherein transforming the cumulative signal amount for the plurality of fixed time buckets into the predicted activity data includes using a threshold for the amount of signals that are needed to indicate whether the individual user is likely to be active.

7. The method of claim 1, wherein the contextual feature information includes one or more of a holiday information, a day information, a week information, a month information, a calendar information, a user information, and a user type information.

8. The method of claim 7, wherein the calendar information indicates a calendar event.

9. The method of claim 7, wherein the user information indicates a region in which the individual users is located.

10. The method of claim 7, wherein the user type information indicates whether the individual user is a business user or a personal user.

11. The method of claim 1, wherein the model is trained with signal history and related contextual feature information of a plurality of users, wherein the signal history relates to the service usage.

12. The method of claim 11, wherein the signal history and the related contextual feature information of plurality of users includes signal history relating to two or more service usages.

13. The method of claim 11, wherein the signal history includes a signal amount, and wherein each signal indicates an action taken while using the service.

14. The method of claim 1, wherein predicting the cumulative signal amount includes using an informer-based model.

15. The method of claim 1, wherein the updated personalized service schedule includes predictions, for each fixed time bucket over the predetermined time frame in the future, on whether the individual user is likely to be active or inactive in using the service.

16. A non-transitory computer readable medium storing instructions thereon that, when executed by at least one processor, cause a computing device to:
   receive most recent signal history and a related contextual feature information of an individual user, wherein the signal history relates to a service usage;
   receive contextual feature information of the individual user for a predetermined time frame in the future;
   group the most recent signal history and the related contextual feature information into a plurality of fixed time buckets;
   predict a cumulative signal amount for the individual user for a plurality of fixed time buckets over the predetermined time frame in the future by drawing inferences from a model by passing to the model the grouped most recent signal history and the related contextual feature information of the individual user, and the contextual feature information of the individual user for a predetermined time frame in the future;
   transform the predicted cumulative signal amount of the plurality of fixed time buckets into a predicted activity data, wherein the predicted activity data indicates whether the individual user is likely to be active or inactive;
   update a personalized service schedule for the individual user based on the predicted activity data of the individual user; and
   initiating one or more of disabling the service, pausing the service, disabling a feature of the service, and pausing a feature of the service when the personalized service schedule indicates that the individual user is likely to be inactive.

17. The non-transitory computer medium of claim 16, wherein the personalized service schedule is used for activating or resuming the service or a feature of the service when the predicted activity data indicates that the individual user is likely to be active.

18. A system comprising:
- at least one processor;
- memory in electronic communication with the at least one processor; and
- instructions stored in the memory, the instructions being executable by the at least one processor to:
    - receive signal history and related contextual feature information of a plurality of users, wherein the signal history relates to a service usage;
    - group the signal history and the related contextual feature information of the plurality of users into a plurality of fixed time buckets;
    - train a machine learning (ML) model based on the grouped signal history and the related contextual feature information of the plurality of users;
    - receive most recent signal history and a related contextual feature information of an individual user, wherein the signal history relates to the service usage;
    - receive contextual feature information of the individual user for a predetermined time frame in the future;
    - group the most recent signal history and the related contextual feature information into a plurality of fixed time buckets;
    - predict a cumulative signal amount for the individual user for a plurality of fixed time buckets over the predetermined time frame in the future by drawing inferences from the ML model by passing to the ML model the grouped most recent signal history and the related contextual feature information of the individual user, and the contextual feature information of the individual user for a predetermined time frame in the future;
    - transform the predicted cumulative signal amount of the plurality of fixed time buckets into a predicted activity data, wherein the predicted activity data indicates whether the individual user is likely to be active or inactive; and
    - update a personalized service schedule for the individual user based on the predicted activity data of the individual user.

19. The system of claim 18, wherein the personalized service schedule is used for one or more of disabling the service, pausing the service, or disabling or pausing a feature of the service when the predicted activity data indicates that the user is likely to be inactive.

20. The system of claim 18, wherein the personalized service schedule is used for activating or resuming the service or a feature of the service when the predicted activity data indicates that the user is likely to be active.

* * * * *